(12) United States Patent
Birecki et al.

(10) Patent No.: US 10,416,782 B2
(45) Date of Patent: Sep. 17, 2019

(54) DISPLAY DEVICE

(71) Applicant: Hewlett-Packard Development Company, L.P., Spring, TX (US)

(72) Inventors: Henryk Birecki, Palo Alto, CA (US); Omer Gila, Palo Alto, CA (US); Boris Balacheff, Lyons (FR); Napoleon Leoni, Palo Alto, CA (US); Steven J Simske, Fort Collins, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/308,066

(22) PCT Filed: Jul. 29, 2014

(86) PCT No.: PCT/US2014/048630
§ 371 (c)(1),
(2) Date: Oct. 31, 2016

(87) PCT Pub. No.: WO2016/018257
PCT Pub. Date: Feb. 4, 2016

(65) Prior Publication Data
US 2017/0060263 A1 Mar. 2, 2017

(51) Int. Cl.
| G06F 3/03 | (2006.01) |
| G02F 1/167 | (2019.01) |
| G06F 3/147 | (2006.01) |
| G09G 3/34 | (2006.01) |
| G06F 21/31 | (2013.01) |

(52) U.S. Cl.
CPC .............. *G06F 3/03* (2013.01); *G02F 1/167* (2013.01); *G06F 3/147* (2013.01); *G06F 21/31* (2013.01); *G09G 3/344* (2013.01); *G09G 2380/14* (2013.01)

(58) Field of Classification Search
CPC . G06F 3/03; G06F 3/147; G06F 21/31; G02F 1/167; G09G 3/344; G09G 2380/14
See application file for complete search history.

(56) References Cited

U.S. PATENT DOCUMENTS

| 5,866,284 | A | 2/1999 | Vincent | |
| 6,118,426 | A * | 9/2000 | Albert | B41J 2/01 |
| | | | | 315/150 |
| 6,333,754 | B1 | 12/2001 | Oba et al. | |
| 6,459,418 | B1 * | 10/2002 | Comiskey | B41J 2/01 |
| | | | | 345/107 |

(Continued)

FOREIGN PATENT DOCUMENTS

| JP | 2009037274 A | 2/2009 |
| JP | 2010026906 A | 2/2010 |

OTHER PUBLICATIONS

E-Paper Displays for Industrial Use; M-Comp; http://www.m-comp.dk/files/files/E-paper.pdf; Jul. 10, 2011.

*Primary Examiner* — Sejoon Ahn
(74) *Attorney, Agent, or Firm* — Dicke Billig & Czaja PLLC

(57) ABSTRACT

One example includes a display device. The display device includes an electronic paper display imageable by receiving charges on an imaging surface of the electronic paper display. The display device includes an embedded chip to enable writing to the electronic paper display based on a successful authentication.

17 Claims, 5 Drawing Sheets

(56) References Cited

U.S. PATENT DOCUMENTS

| | | |
|---|---|---|
| 6,515,790 B2 | 2/2003 | Miyamoto et al. |
| 6,982,734 B2 | 1/2006 | Pan |
| 7,140,550 B2 | 11/2006 | Ramachandran |
| 7,539,649 B2 | 5/2009 | Guthery |
| 7,580,845 B2 | 8/2009 | Burman et al. |
| 7,834,843 B2 | 11/2010 | Karaki |
| 7,856,555 B2 | 12/2010 | Jung et al. |
| 8,144,388 B2 | 3/2012 | Ogawa |
| 8,514,256 B2 | 8/2013 | Ogawa et al. |
| 2002/0021270 A1* | 2/2002 | Albert ............... G02F 1/167 345/84 |
| 2002/0099956 A1* | 7/2002 | Suzuki ............ G06F 21/31 726/26 |
| 2002/0109665 A1* | 8/2002 | Matthews ......... G06F 1/1601 345/156 |
| 2003/0005299 A1* | 1/2003 | Xia ................ G06F 21/31 713/171 |
| 2003/0034950 A1* | 2/2003 | Liang ............... G02F 1/167 345/107 |
| 2003/0067427 A1 | 4/2003 | Comiskey et al. |
| 2003/0179169 A1* | 9/2003 | Izumi ............. G02F 1/1345 345/87 |
| 2004/0098740 A1* | 5/2004 | Maritzen ........... G06Q 20/00 725/27 |
| 2004/0160684 A1* | 8/2004 | Prins ............. G02B 26/005 359/832 |
| 2004/0246684 A1* | 12/2004 | Karaki ............. G06F 1/10 361/749 |
| 2005/0134550 A1 | 6/2005 | Schmitz |
| 2006/0017659 A1* | 1/2006 | Ogawa ............. B41J 3/4076 345/30 |
| 2006/0103916 A1* | 5/2006 | Kawai .............. G02F 1/167 359/296 |
| 2006/0155913 A1* | 7/2006 | Nishikawa ........ G06K 7/0004 711/100 |
| 2006/0206429 A1* | 9/2006 | Martinez ........... G06Q 99/00 705/50 |
| 2007/0045399 A1 | 3/2007 | Martin |
| 2007/0046623 A1* | 3/2007 | Song ............... G02F 1/167 345/107 |
| 2007/0054730 A1* | 3/2007 | Mattice ........... G07F 17/3211 463/16 |
| 2007/0180252 A1* | 8/2007 | Jung .............. B41J 3/4076 713/176 |
| 2008/0150887 A1* | 6/2008 | Kim ............... G02F 1/167 345/107 |
| 2008/0179173 A1* | 7/2008 | Jung .............. H01H 13/83 200/314 |
| 2008/0189762 A1* | 8/2008 | Toriumi ........... G06F 21/32 726/2 |
| 2008/0204435 A1 | 8/2008 | Miyamoto |
| 2008/0259071 A1 | 10/2008 | Nemoto et al. |
| 2008/0297878 A1* | 12/2008 | Brown ............. B82Y 10/00 359/263 |
| 2011/0080417 A1* | 4/2011 | Lin ................ G09G 3/344 345/522 |
| 2011/0298760 A1* | 12/2011 | Gila ............... G02F 1/167 345/179 |
| 2012/0105942 A1* | 5/2012 | Nakagawa ......... G02F 1/167 359/296 |
| 2012/0206341 A1 | 8/2012 | Gila et al. |
| 2012/0320001 A1 | 12/2012 | Gila et al. |
| 2013/0003162 A1 | 1/2013 | Leoni et al. |
| 2013/0235446 A1 | 9/2013 | Leoni et al. |
| 2013/0287274 A1* | 10/2013 | Shi ................ G06F 3/044 382/124 |
| 2014/0087656 A1* | 3/2014 | Boelter ............ G06F 21/31 455/41.1 |
| 2014/0210805 A1 | 7/2014 | Birecki et al. |
| 2014/0239068 A1 | 8/2014 | Park |
| 2014/0253426 A1 | 9/2014 | Leoni et al. |

* cited by examiner

DISPLAY DEVICE

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

Figure 1:
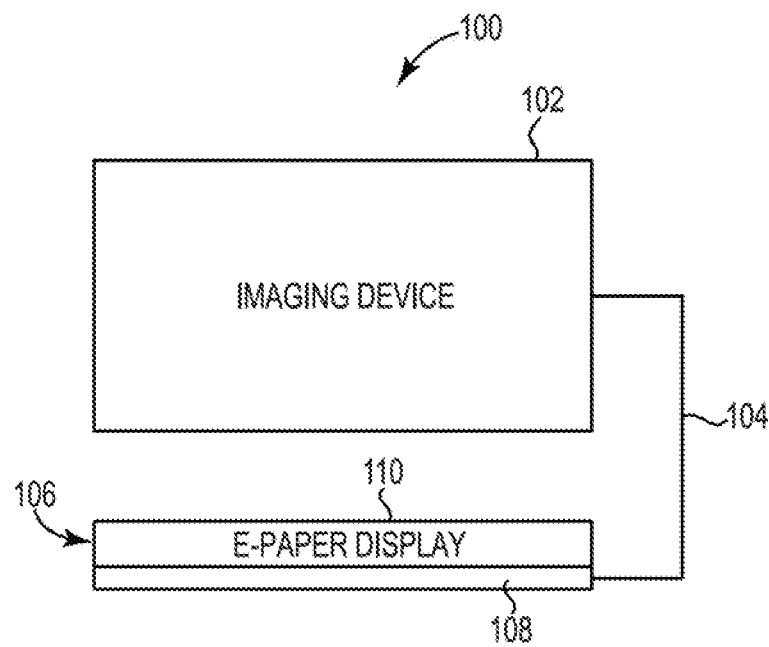
FIG. 1 illustrates one example of an imaging system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electronic paper ("e-paper") is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those that are used in printing allows the e-paper to be read at a wide range of angles and lighting conditions, including full sunlight. The use of ambient light also eliminates the need for illumination produced by the device, such as a backlight. This minimizes the power used by the e-paper. In addition, existing forms of e-paper do not use power to maintain the image. Once the image is written, the image remains on the e-paper for an extended period of time or until, the e-paper is rewritten. Thus, a typical e-paper primarily uses power for changing the optical state of the e-paper.

E-paper is typically written by generating a charge on a surface in proximity to a layer of microcapsules that contain charged pigment particles. The charge on the surface attracts or repels the charged pigment particles in the microcapsules to create the desired image. No physical supplies (e.g., ink) are used for writing to e-paper and the power used to write to e-paper is low.

For some applications of e-paper, a user may want to write information to the e-paper and have the information remain displayed indefinitely and/or permanently. For example, the information written to the e-paper could be user identification information or allowed use information. For other applications, a user may want to enable or disable writing to the e-paper on a case by case basis.

The following disclosure describes examples of a display device, such as a gift card, prepaid card, debit card, credit card, access card, etc., that includes a passive e-paper display. The passive e-paper display is imageable by receiving charges on an imaging surface of the e-paper display from an imaging device. The display device includes an embedded chip (e.g., smart chip) and a switch (e.g. Field Effect Transistor (FET)) controlled by the embedded chip that enables and disables writing to the e-paper display. The e-paper display is enabled by closing the switch to connect a ground return path of the e-paper display and disabled by opening the switch to disconnect the ground return path of the e-paper display. The embedded chip enables or disables the switch based on a successful authentication of an imaging device and/or other suitable devices and/or a user. In response to a successful authentication, the embedded chip enables writing to the e-paper display. In response to an unsuccessful authentication, the embedded chip disables writing to the e-paper display.

FIG. 1 illustrates one example of an imaging system 100. Imaging system 100 includes an imaging device 102 and an e-paper display device 106. In one example, e-paper display device 106 is a gift card, prepaid card, debit card, credit card, access card, or other suitable device. E-paper display device 106 includes a ground electrode 108 opposite to an imaging surface 110. Ground electrode 108 provides a counter-electrode for e-paper display device 106. E-paper display device 106 also includes an active layer that switches color when an electric field or electrical charges is/are applied to imaging surface 110 of e-paper display device 106. In one example, the active layer contains a switchable pigment or dye combination. A resin or polymer may be used to encapsulate the active layer. One example of an e-paper display is further described below with reference to FIG. 7.

Imaging device 102 erases and/or writes to e-paper display device 106. In one example, prior to erasing and/or writing to e-paper display device 106, imaging device 102 sends a request to e-paper display device 106 to enable writing. In response to the request to enable writing, e-paper display device 106 and imaging device 102 perform an authentication process to authenticate imaging device 102 and/or a user of e-paper display device 106. E-paper display device 106 enables writing based on a successful authentication of imaging device 102 and/or the user as will be described in more detail below with reference to FIGS. 2-6. Prior to and during erasing or writing to e-paper display device 106, imaging device 102 is electrically coupled to ground electrode 108 of e-paper display device 106 through a ground connection 104. Once e-paper display device 106 has been erased and/or written, ground connection 104 may be removed.

Ground electrode 108 and ground connection 104 allow counter charges to flow to ground electrode 108 from imaging device 102. Thus, e-paper display device 106 remains basically charge neutral despite charges being ejected onto imaging surface 110. Without a connection between ground electrode 108 and imaging device 102, no appreciable amount of charges can be ejected onto imaging surface 110 and thus no information can be written to e-paper display device 106.

Figure 2:
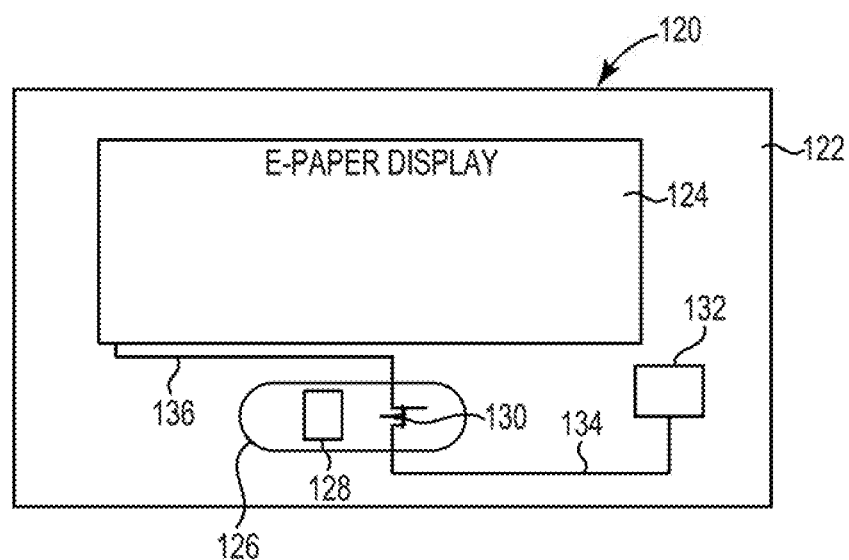
FIG. 2 illustrates one example of a display device.

FIG. 2 illustrates one example of a display device 120. Display device 120 may be used in imaging system 100 previously described and illustrated with reference to FIG. 1. In one example, display device 120 is in the form of a card, such as a gift card, prepaid card, debit card, credit card, access card, or other suitable card. Display device 120 includes a support structure 122, an e-paper display 124, a circuit 126, and a ground connection contact 132. Circuit 126 includes an embedded chip 128 (e.g., smart chip) and a switch 130 (e.g., Field Effect Transistor (FET)). One example of e-paper display 124 is further described below with reference to FIG. 7. Display device 120 may also include permanent markings for card branding, the card owner's name, or other suitable text and/or images. In addition, display device 120 may include a magnetic stripe, bar code, Quick Response (QR) code, or other suitable component for storing or encoding information for display device 120.

E-paper display 124, circuit 126, and ground connection contact 132 are mounted in support structure 122. Support structure 122 can be composed of a transparent material or an opaque material. Support structure 122 can be composed of polyester, plastic, glass, transparent Mylar, or other suitable material. In one example, support structure 122 includes a bottom layer and a top layer with e-paper display 124 arranged between the bottom layer and the top layer.

Ground connection contact 132 is exposed on a surface of display device 120. Ground connection contact 132 is electrically coupled to one side of switch 130 through a ground connection 134. The other side of switch 130 is electrically coupled to the ground electrode of e-paper display 124 through a ground connection 136. Ground connection contact 132 is used to electrically couple an imaging device to the ground electrode of e-paper display 124 during erasing and/or writing to e-paper display 124.

Switch 130 is controlled by embedded chip 128 to enable or disable writing to e-paper display 124. Embedded chip 128 derives power and communicates with an imaging device by direct contact, Near Field Communication (NFC), inductive coupling, or another suitable method. In another example, embedded chip 128 derives power from an internal battery of display device 120. Embedded chip 128 implements an authentication protocol prior to enabling writing to e-paper display 124. Data exchanges between the imaging device and the embedded chip 128 determine whether e-paper display 124 is enabled for writing. If e-paper display 124 is to be enabled for writing, embedded chip 128 closes switch 130 to electrically couple ground connection contact 132 to the ground electrode of e-paper display 124. If e-paper display 124 is to be disabled for writing, embedded chip 128 opens switch 130 to electrically isolate ground connection contact 132 from the ground electrode of e-paper display 124.

Embedded chip 128 enables writing to e-paper display 124 in response to a request from an imaging device to enable writing and in response to a successful authentication. The authentication protocol may authenticate any one of or any suitable combination of the imaging device, a computing system (e.g., point of sale terminal, kiosk, computer) hosting the imaging device, a user, and/or other network based services that may confirm time and/or location. In one example, the authentication protocol may rely on a passcode or password, but the embedded chip may use strong authentication from a number of sources to validate that its policy to enable writing to the e-paper display is fulfilled.

In one example, an authentication protocol is implemented between embedded chip 128 and an imaging device seeking to write to e-paper display device 120. In one example, if a successful authentication of the imaging device is performed, but an unsuccessful authentication of a user is performed, embedded chip 128 enables e-paper display 124 for writing and instructs the successfully authenticated imaging device to write a message to e-paper display 124 indicating that the user authentication failed. After writing to e-paper display 124 is complete, embedded chip 128 opens switch 130 to disable writing to e-paper display 124. With writing to e-paper display 124 disabled, the information displayed on e-paper display 124 cannot be modified.

Figure 3:
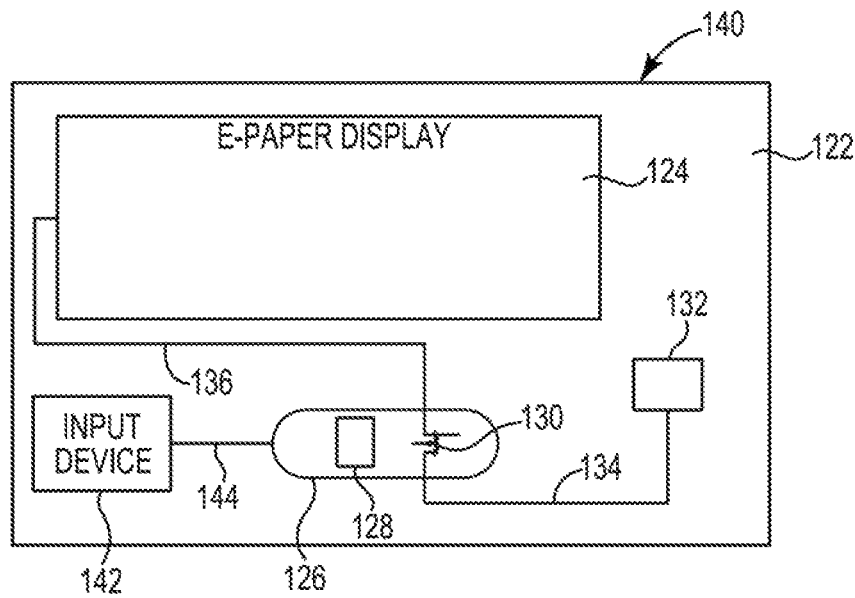
FIG. 3 illustrates another example of a display device.

FIG. 3 illustrates another example of a display device 140. Display device 140 is similar to display device 120 previously described and illustrated with reference to FIG. 2, except that display device 140 includes an input device 142. Input device 142 is communicatively coupled to circuit 126 and embedded chip 128 through a communication link 144.

Input device 142 is mounted in support structure 122. Input device 142 is used to authenticate a user. Input device 143 receives an authentication value from a user and communicates the authentication value to embedded chip 128 for use in an authentication protocol for enabling e-paper display 124 prior to writing to e-paper display 124. Input device 142 includes a fingerprint reader, entry pad, haptic pad, keyboard, or other input device suitable for receiving an authentication value from a user. In response to a successful authentication, embedded chip 128 closes switch 130 to enable writing to e-paper display 124. In one example, after writing to e-paper display 124, embedded chip 128 opens switch 130 to disable writing to e-paper display 124.

Figure 4:
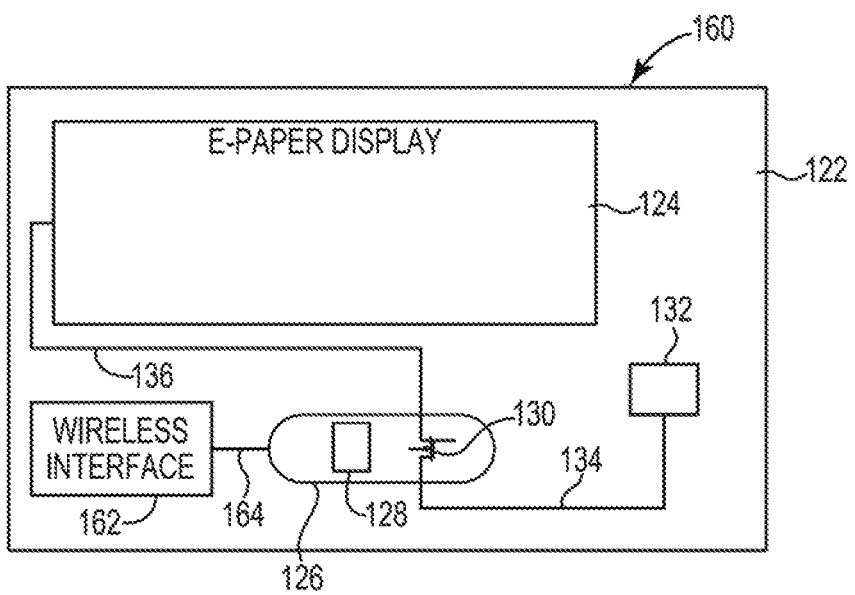
FIG. 4 illustrates another example of a display device.

FIG. 4 illustrates another example of a display device 160. Display device 160 is similar to display device 140 previously described and illustrated with reference to FIG. 3, except that display device 160 includes a wireless interface 162 in place of input device 142. Wireless interface 162 is communicatively coupled to circuit 126 and embedded chip 128 through a communication link 164.

Wireless interface 162 is mounted in support structure 122. Wireless interface 162 is used to wirelessly implement an authentication protocol with an imaging device, a user, and/or another suitable device. In one example, to authenticate a user, wireless interface 162 receives an authentication value from a user via an imaging device and communicates the authentication value to embedded chip 128 for use in an authentication protocol for enabling e-paper display 124 prior to writing to e-paper display 124. Wireless interface 162 includes a Bluetooth interface, Wi-Fi interface, or other interface suitable for wirelessly implementing an authentication protocol. In response to a successful authentication, embedded chip 128 closes switch 130 to enable writing to e-paper display 124. In one example, after writing to e-paper display 124, embedded chip 128 opens switch 130 to disable writing to e-paper display 124.

Figure 5:
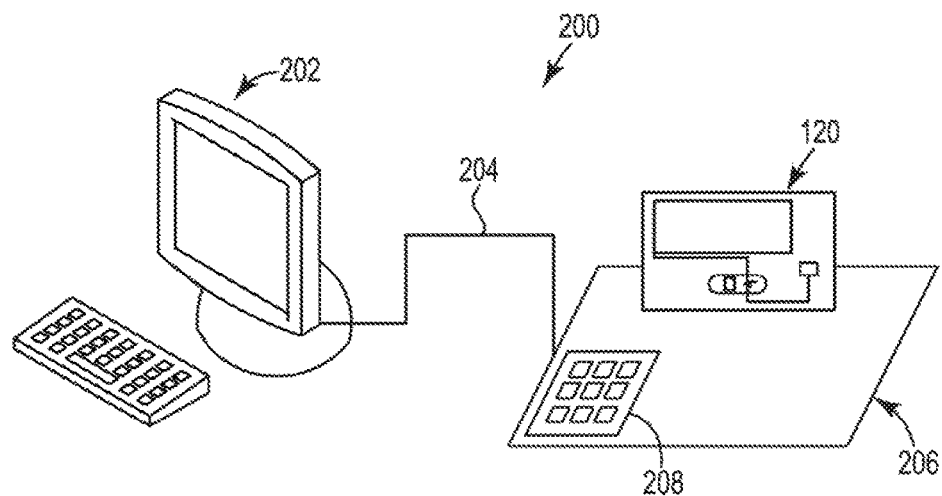
FIG. 5 illustrates one example of a system for accessing a display device.

FIG. 5 illustrates one example of a system 200 for accessing a display device 120, which was previously described and illustrated with reference to FIG. 2. System 200 includes a computing device 202, such as a point of sale terminal, and a dock 206. Computing device 202 is communicatively coupled to dock 206 through a communication link 204. Dock 206 includes an input device 208, such as a keypad. In other examples, input device 208 may be a fingerprint reader, keyboard, or other suitable input device.

In one example, dock 206 includes an imaging device for writing to e-paper display 124 (FIG. 2) of display device 120.

To write to display device 120, display device 120 is physically connected to dock 206 such that embedded chip 128 (FIG. 2) is communicatively coupled to dock 206 and input device 208. Computing device 202 exchanges data with display device 120 via dock 206. Prior to writing to the e-paper display of display device 120, computing device 202 sends an enable writing request to display device 120. In one example, the user is then expected to enter the authentication value for display device 120 for authenticating the user through input device 208 without prompting. In another example, in addition to sending the enable writing request to display device 120, computing device 202 prompts the user to enter the authentication value for display device 120 through input device 208. In response to receiving the enable writing request and a successful authentication, the embedded chip enables writing to the e-paper display of display device 120. In one example, after writing to the e-paper display, the embedded chip disables writing to the e-paper display.

Figure 6:
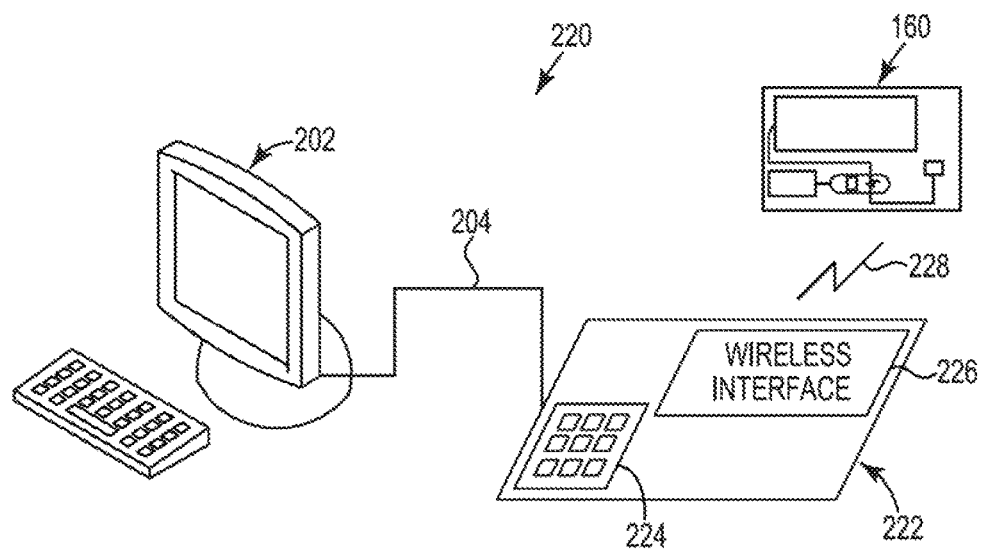
FIG. 6 illustrates another example of a system for accessing a display device.

FIG. 6 illustrates another example of a system 220 for accessing a display device 160, which was previously described and illustrated with reference to FIG. 4. System 220 includes a computing device 202, such as a point of sale terminal, and a dock 222. Computing device 202 is communicatively coupled to dock 222 through a communication link 204. Dock 222 includes an input device 224, such as a keypad, and a wireless interface 226. In other examples, input device 224 may be a fingerprint reader, keyboard, or other suitable input device. In one example, dock 222 includes an imaging device for writing to e-paper display 124 (FIG. 4) of display device 160.

To write to display device 160, display device 160 is communicatively connected to dock 222 through a wireless communication link 228 between wireless interface 226 of dock 222 and wireless interface 162 (FIG. 4) of display device 160. In this way, embedded chip 128 (FIG. 4) of display device 160 is communicatively coupled to dock 222 and input device 224. Computing device 202 exchanges data with display device 160 via wireless interface 226 of dock 226. Prior to writing to the e-paper display of display device 160, computing device 202 sends an enable writing request to display device 160. In one example, the user is then expected to enter the authentication value for display device 160 for authenticating the user through input device 224 without prompting. In another example, in addition to sending the enable writing request to display device 160, computing device 202 prompts the user to enter the authentication value for display device 160 through input device 224. In response to receiving the enable writing request and a successful authentication, the embedded chip enables writing to the e-paper display of display device 160. In one example, after writing to the e-paper display, the embedded chip disables writing to the e-paper display.

Figure 7:
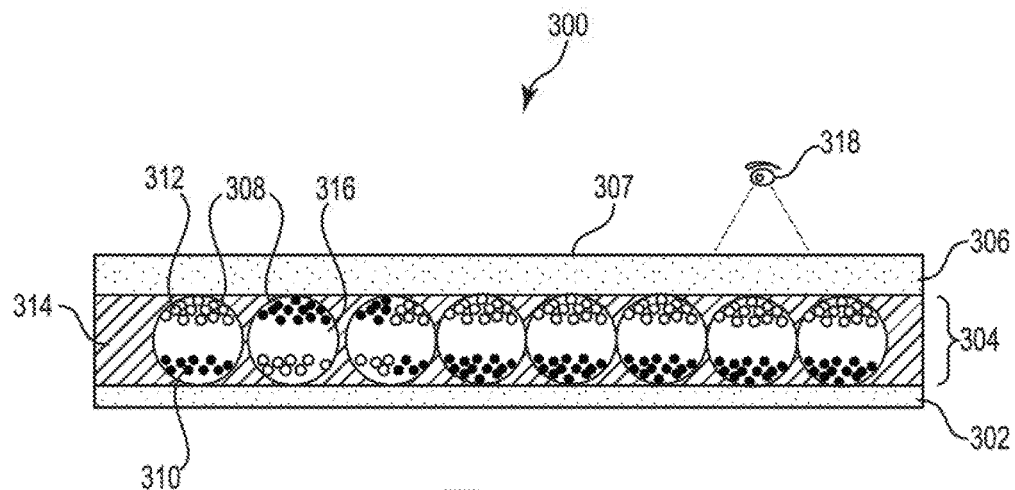
FIG. 7 illustrates a cross-sectional view of one example of an electronic paper ("e-paper") display.

FIG. 7 illustrates a cross-sectional view of one example of an e-paper display 300. In one example, e-paper display 300 is used for e-paper display 124 previously described and illustrated with reference to FIGS. 2-4. E-paper display 300 includes a ground electrode 302, an active layer 304, and a transparent charge receiving layer 306. Active layer 304 includes microcapsules 308 encapsulated by a resin or polymer 314. In one example, each microcapsule 308 includes black particles 310 and white particles 312 suspended in a fluid medium 316. Surface 307 of charge receiving layer 306 provides the imaging surface for e-paper display 300 and is also the viewing side for a viewer 318 in this example.

Ambient light is transmitted through charge receiving layer 306, strikes microcapsules 308, and is reflected back to the viewer 318. When white particles 312 of a microcapsule 308 are located near charge receiving layer 306, the microcapsule appears white to a viewer 318. When black particles 310 of a microcapsule 308 are located near charge receiving layer 306, the microcapsule appears black to the viewer 318. The particles 310 and 312 have opposite charges. For example, black particles 310 can be positively charged particles, and white particles 312 can be negatively charged particles. Various shades of gray can be created by varying the arrangement of alternating microcapsules with white and black particles located near charge receiving layer 306 to produce halftoning.

Microcapsules 308 exhibit image stability using chemical adhesion between particles and/or between the particles and the microcapsule surface. For example, microcapsules 308 can hold text and images indefinitely without using electricity, while allowing the text or images to be changed later.

The structure, materials, and dimensions of the various layers and components of e-paper display 300 can be adapted to specific design criteria. In one example, the transparent charge receiving layer 306 can be composed of a transparent polymer and can have a thickness between 50 µm and 250 µm. The transparent charge receiving layer 306 can also be composed of a material that holds charges or is porous or semi-porous to charges and/or ions.

The diameter of each microcapsule 308 is substantially constant within e-paper display 300 and can be in one example between 20 µm and 100 µm, such as 50 µm. Conductive ground electrode 302 can be composed of a transparent conductive material, such as indium tin oxide, or an opaque material. In one example, ground electrode 302 has a thickness between 10 nm and 1 mm, or larger depending on how e-paper display 300 is to be used.

In other examples, e-paper display 300 has a variety of other configurations. For example, each microcapsule 308 may include black particles suspended in a white colored fluid. The black particles can be positively charged particles or negatively charged particles. One or more microcapsules form a pixel of black and white images displayed on e-paper display 300. The black and white images are created by placing black particles near or away from charge receiving layer 306. For example, the microcapsules with black particles located away from charge receiving layer 306 reflect white light, corresponding to a white portion of an image displayed on e-paper display 300. In contrast, the microcapsules with black particles located near charge receiving layer 306 appear black to a viewer 318 corresponding to a black portion of the image displayed on e-paper display 300. Various shades of gray can be created by using halftoning with black particles located near or away from charge receiving layer 306.

Charge receiving layer 306 may be tinted with alternating blue, red, and green regions. Adjacent blue, red, and green regions form color pixels. Color images are created by placing different combinations of white or black particles near charge receiving layer 306. For example, the microcapsules of a color pixel with white particles located near the red and green regions of charge receiving layer 306 reflect red and green light from e-paper display 300. The viewer 318 will perceive this combination as a yellow pixel. When the black particles in the microcapsules are located near charge receiving layer 306, that color pixel will appear black to the viewer 318. Additionally or alternatively, the black particles 310 of each microcapsule can be replaced by blue, red, or green positively or negatively charged particles. The particles can be used alone or in combination with a tinted charge receiving layer 306 to create a desired color image. Various color/chroma/hue shades or saturation can be attained by using halftoning with the particles located near or away from charge receiving layer 306.

In another example, an alternative configuration for an e-paper display may be used in which the viewing side for a viewer 318 is located on the side of ground electrode 302. For this example, charge receiving layer 306 does not need to be transparent and the properties of charge receiving layer 306 are optimized to receive charges and transport the charges to the microcapsules.

Figure 8:
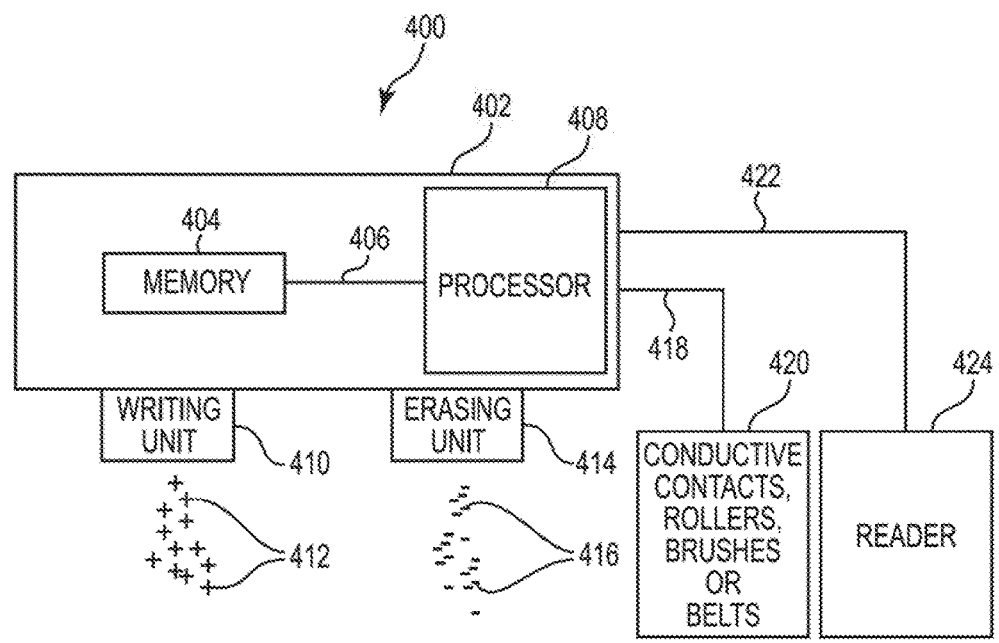
FIG. 8 illustrates one example of an imaging device.

FIG. 8 illustrates one example of an imaging device 400. In one example, imaging device 400 provides imaging device 102 previously described and illustrated with reference to FIG. 1 and/or may be part of dock 206 previously described and illustrated with reference to FIG. 5 and/or dock 222 previously described and illustrated with reference to FIG. 6. Imaging device 400 is used to read information from and write information to display device 120, 140, and/or 160 previously described and illustrated with reference to FIGS. 2-4.

Imaging device 400 includes an imaging unit 402, conductive contacts, rollers, brushes, or belts 420, and a reader 424. Conductive contacts, rollers, brushes, or belts 420 are electrically coupled to imaging unit 402 through a signal path 418. Reader 424 is communicatively coupled to imaging unit 402 through a communication link 422. Imaging unit 402 includes a memory 404, a processor 408, a corona writing unit 410, and a corona erasing unit 414.

Processor 408 is communicatively coupled to memory 404 through a communication link 406. Processor 408 includes a Central Processing Unit (CPU) or another suitable processor. In one example, memory 404 stores instructions executed by processor 408 for operating imaging device 400. Memory 404 includes any suitable combination of volatile and/or non-volatile memory, such as combinations of Random Access Memory (RAM), Read-Only Memory (ROM), flash memory, and/or other suitable memory. In one example, processor 408 executes instructions to control imaging device 400 for accessing a display device including reading information from the display device via reader 424 and erasing and/or writing to an e-paper display of the display device.

Corona writing unit 410 and corona erasing unit 414 are located on the same side of imaging unit 402. In one example, corona writing unit 410 and corona erasing unit 414 each include an addressable non-contact ion source. In one example, corona erasing unit 414 selectivity ejects negative ions 416 toward an imaging surface of an e-paper display to erase any text and/or images on the e-paper display by repelling the negatively charged particles and/or by attracting the positively charged particles within the e-paper display toward the imaging surface. Corona writing unit 410 selectively ejects positive ions 412 toward an imaging surface of an e-paper display to write desired text and/or images on the e-paper display by repelling the positively charged particles and/or by attracting the negatively charged particles within the e-paper display toward the imaging surface. The corona polarities may be changed to match the polarities of the charged particles and the side from which the e-paper display is viewed.

Conductive contacts, rollers, brushes, or belts 420 make contact with the ground connection of the e-paper display of a display device during erasing and/or writing of the e-paper display to provide an electrical connection to the ground electrode (e.g., ground electrode 302 previously described and illustrated with reference to FIG. 7 of the e-paper display. When using conductive rollers or belts, the rollers or belts can also set the spacing between corona writing unit 410 and corona erasing unit 414 and the e-paper display during writing of the e-paper display. The conductive rollers or belts are composed of any suitable electrically conductive material, such as a metal or conductive rubber. When using a conductive brush, the brush is composed of any suitable electrically conductive material, such as a metal or carbon.

Reader 424 may access a display device for reading information from a display device. Reader 424 includes a magnetic stripe reader, bar code reader, QR code reader, smart chip reader, NFC interface, image sensor, or other suitable device for reading information from a display device. The information read from a display device may be used to perform a transaction, such as a financial transaction.

Figure 9:
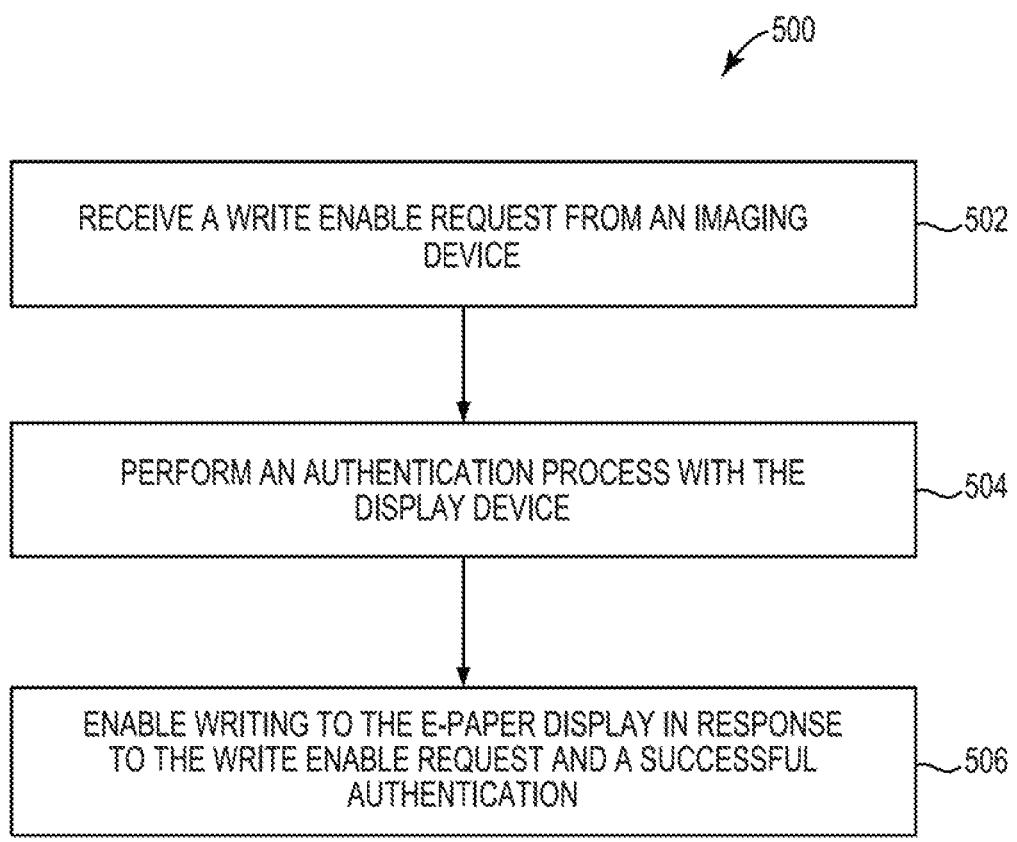
FIG. 9 is a flow diagram illustrating one example of a method for writing to a display device.

FIG. 9 is a flow diagram illustrating one example of a method 500 for writing to a display device, such as display device 120, 140, and/or 160 previously described and illustrated with reference to FIGS. 2-4. At 502, method 500 includes receiving a write enable request from an imaging device. At 504, an authentication process is performed with the display device. The authentication process may authenticate the imaging device and/or another suitable device and/or a user. For the authentication of a user, the display device may receive an authentication value, such as a password or passcode, or other suitable authentication value. At 506, writing to the e-paper display is enabled in response to the write enable request and a successful authentication.

In one example, in response to an unsuccessful authentication, writing to the e-paper display is disabled. In another example, in response to a successful authentication of the imaging device and an unsuccessful authentication of a user, the e-paper display is enabled for writing of a not authorized message to the e-paper display and disabled after writing of the not authorized message.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A display device comprising:
   a support structure;
   an electronic paper display imageable by receiving charges on an imaging surface of the electronic paper display, the electronic paper display comprising a single transparent charge receiving layer providing the imaging surface;
   a single ground electrode arranged opposite to the imaging surface of the electronic paper display;
   a ground connection contact mounted in the support structure; and
   an embedded chip to enable writing to the electronic paper display based on a successful authentication,
   wherein the embedded chip controls a switch to electrically couple the single ground electrode to the ground connection contact based on the successful authentication.

2. The display device of claim 1, wherein the embedded chip disables writing to the electronic paper display after writing to the electronic paper display.

3. The display device of claim 1, wherein the embedded chip enables writing to the electronic paper display in response to an enable request from an imaging device and a successful authentication of the imaging device and a user.

4. The display device of claim 1, wherein the display device comprises a gift card, prepaid card, debit card, credit card, or access card.

5. A display device comprising:
 a support structure;
 an electronic paper display imageable by receiving charges on an imaging surface of the electronic paper display, the electronic paper display comprising a single transparent charge receiving layer providing the imaging surface;
 a single ground electrode arranged opposite to the imaging surface of the electronic paper display;
 a ground connection contact mounted in the support structure; and
 an embedded chip to electrically connect the single ground electrode to the ground connection contact based on a successful authentication.

6. The display device of claim 5, wherein the embedded chip implements an authentication protocol.

7. The display device of claim 5, further comprising:
 an input device communicatively coupled to the embedded chip, the input device to receive an authentication value for authenticating a user.

8. The display device of claim 7, wherein the input device comprises a fingerprint reader, an entry pad, a haptic pad, or a keyboard.

9. The display device of claim 5, wherein authentication is performed via an input device of a dock to which the display device is docked.

10. The display device of claim 5, further comprising:
 a wireless interface communicatively coupled to the embedded chip, the wireless interface to perform an authentication via a wireless communication link.

11. A method for writing to a display device, the method comprising:
 receiving a write enable request from an imaging device, the imaging device for writing to the display device, the display device comprising an electronic paper display imageable by receiving charges on an imaging surface of the electronic paper display, the electronic paper display comprising a single transparent charge receiving layer providing the imaging surface;
 performing an authentication process with the display device; and
 enabling writing to the electronic paper display in response to the write enable request and a successful authentication,
 wherein enabling writing to the electronic paper display comprises electrically connecting a single ground electrode to a ground connection.

12. The method of claim 11, further comprising:
 disabling writing to the electronic paper display in response to an unsuccessful authentication.

13. The method of claim 11, wherein performing an authentication process with the display device comprises authenticating the imaging device and authenticating the user, and further comprising:
 enabling writing of a not authorized message to the electronic paper display in response to a successful authentication of the imaging device and an unsuccessful authentication of a user; and
 disabling writing to the electronic paper display after writing of the not authorized message.

14. The method of claim 11, wherein performing the authentication process comprises receiving an authentication value from a user for authenticating the user.

15. The method of claim 11, wherein the imaging device includes a writing unit to selectively eject positive ions towards the display device.

16. The display device of claim 1, wherein the imaging surface is a viewing surface.

17. The display device of claim 5, wherein the imaging surface comprises the viewing surface and wherein the charges are received on the same side of the viewing surface from which an image is viewable.

* * * * *